(12) United States Patent
Kimura

(10) Patent No.: US 7,630,564 B2
(45) Date of Patent: *Dec. 8, 2009

(54) DECODING APPARATUS, DEQUANTIZING METHOD, AND PROGRAM THEREOF

(75) Inventor: Shunichi Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 554 days.

This patent is subject to a terminal disclaimer.

(21) Appl. No.: 11/153,395

(22) Filed: Jun. 16, 2005

(65) Prior Publication Data

US 2006/0210183 A1    Sep. 21, 2006

(30) Foreign Application Priority Data

Mar. 18, 2005    (JP) .............................. 2005-079613

(51) Int. Cl.
*G06K 9/36* (2006.01)
(52) U.S. Cl. ....................................... 382/233; 382/251
(58) Field of Classification Search ................ 382/223, 382/233, 251
See application file for complete search history.

(56) References Cited

U.S. PATENT DOCUMENTS

| | | | |
|---|---|---|---|
| 5,495,538 A | 2/1996 | Fan | |
| 5,608,654 A * | 3/1997 | Matsunoshita | 358/1.15 |
| 5,615,288 A | 3/1997 | Koshi et al. | |
| 5,778,102 A | 7/1998 | Sandford et al. | |
| 5,787,204 A | 7/1998 | Fukuda | |
| 5,822,463 A | 10/1998 | Yokose et al. | |
| 5,828,789 A | 10/1998 | Yokose et al. | |
| 6,072,909 A | 6/2000 | Yokose et al. | |
| 6,157,741 A | 12/2000 | Abe et al. | |
| 6,205,254 B1 | 3/2001 | Koshi et al. | |
| 6,301,368 B1 | 10/2001 | Bolle et al. | |
| 6,510,252 B1 | 1/2003 | Kishimoto | |
| 6,552,822 B1 | 4/2003 | Kishimoto | |
| 6,748,113 B1 | 6/2004 | Kondo et al. | |
| 6,996,282 B1 | 2/2006 | Kondo et al. | |
| 2002/0009209 A1 | 1/2002 | Inoue et al. | |

(Continued)

FOREIGN PATENT DOCUMENTS

CN    1286575 A    3/2001

(Continued)

OTHER PUBLICATIONS

Taubman et al., "JPEG 2000- Image Compression Fundamentals, Standards, and Practice," 2002, Kluwer Academic Publisher, pp. 14, 97-99 and 481-484.*

(Continued)

*Primary Examiner*—Charles Kim
*Assistant Examiner*—John W Lee
(74) *Attorney, Agent, or Firm*—Oliff & Berridge, PLC

(57) ABSTRACT

A decoding apparatus includes a dequantization-value generating section, distribution-information acquiring section, and a correcting section. The dequantization-value generating section generates a plurality of dequantization values for each quantization index value. The distribution-information acquiring section acquires distribution information of original data corresponding to each quantization index. The correcting section corrects at least a portion of the dequantization values generated by the dequantization-value generating section, based on the distribution information acquired by the distribution-information acquiring section.

4 Claims, 10 Drawing Sheets

U.S. PATENT DOCUMENTS

| | | |
|---|---|---|
| 2002/0081035 A1 | 6/2002 | Bright et al. |
| 2002/0085679 A1 | 7/2002 | Zastrow et al. |
| 2003/0007693 A1 | 1/2003 | Yokose et al. |
| 2003/0215111 A1 | 11/2003 | Zhang et al. |
| 2005/0271284 A1 | 12/2005 | Chen et al. |
| 2006/0045361 A1 | 3/2006 | Yokose |
| 2006/0133686 A1 | 6/2006 | Gomila et al. |

FOREIGN PATENT DOCUMENTS

| | | |
|---|---|---|
| JP | A 5-14735 | 1/1993 |
| JP | A 5-316361 | 11/1993 |
| JP | A-06-054293 | 2/1994 |
| JP | A 7-336684 | 12/1995 |
| JP | A 2004-080741 | 3/2004 |

OTHER PUBLICATIONS

Kegl et al., "Learning and Design of Principal Curves," 2000, IEEE, vol. 22, pp. 281-297.*

Heeger et al., "Pyramid-Based Texture Analysis/Synthesis," Siggraph, pp. 229-238, 1995.

International Telecommunication Union, ITU-T, Telecommunication Standardization Sector of ITU, Series T: Terminals for Telematic Services, Information Technology—JPEG 2000 image coding system: Core coding systems, T.800, pp. 1-194, Aug. 2002.

International Telecommunication Union, CCITT, The International Telegraph and Telephone Consultative Committee, Terminal Equipment and Protocols for Telematic Services, Information Technology—Digital Compression and Coding of Continuous-Tone Still Images—Requirements and Guidelines.

U.S. Appl. No. 11/151,212, filed Jun. 14, 2005, Kimura.
U.S. Appl. No. 11/172,967, filed Jul. 5, 2005, Kimura.
U.S. Appl. No. 11/168,920, filed Jun. 29, 2005, Kimura.
U.S. Appl. No. 11/179,988, filed Jul. 13, 2005, Kimura.

Gersho et al.; "The Optical Decoder for a Given Encoder"; Vector Quantization and Signal Compression; pp. 177-178; 1992.

U.S. Appl. No. 11/500,946, filed Aug. 9, 2006, Kimura.

* cited by examiner

CODING PROCESS

DECODING PROCESS

QUANTIZATION IN JPEG

QUANTIZATION IN JPEG2000

QUANTIZATION INTERVAL

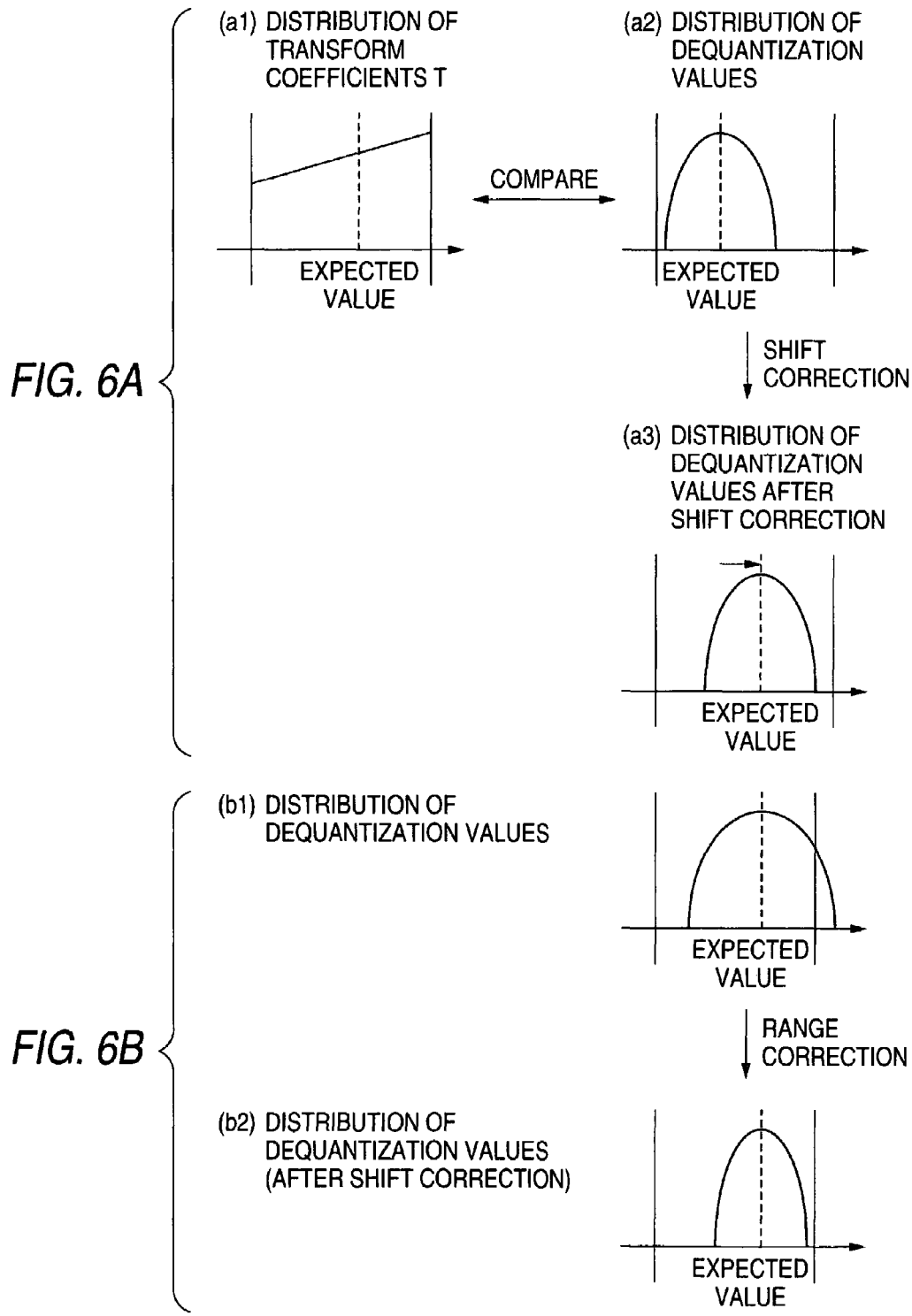

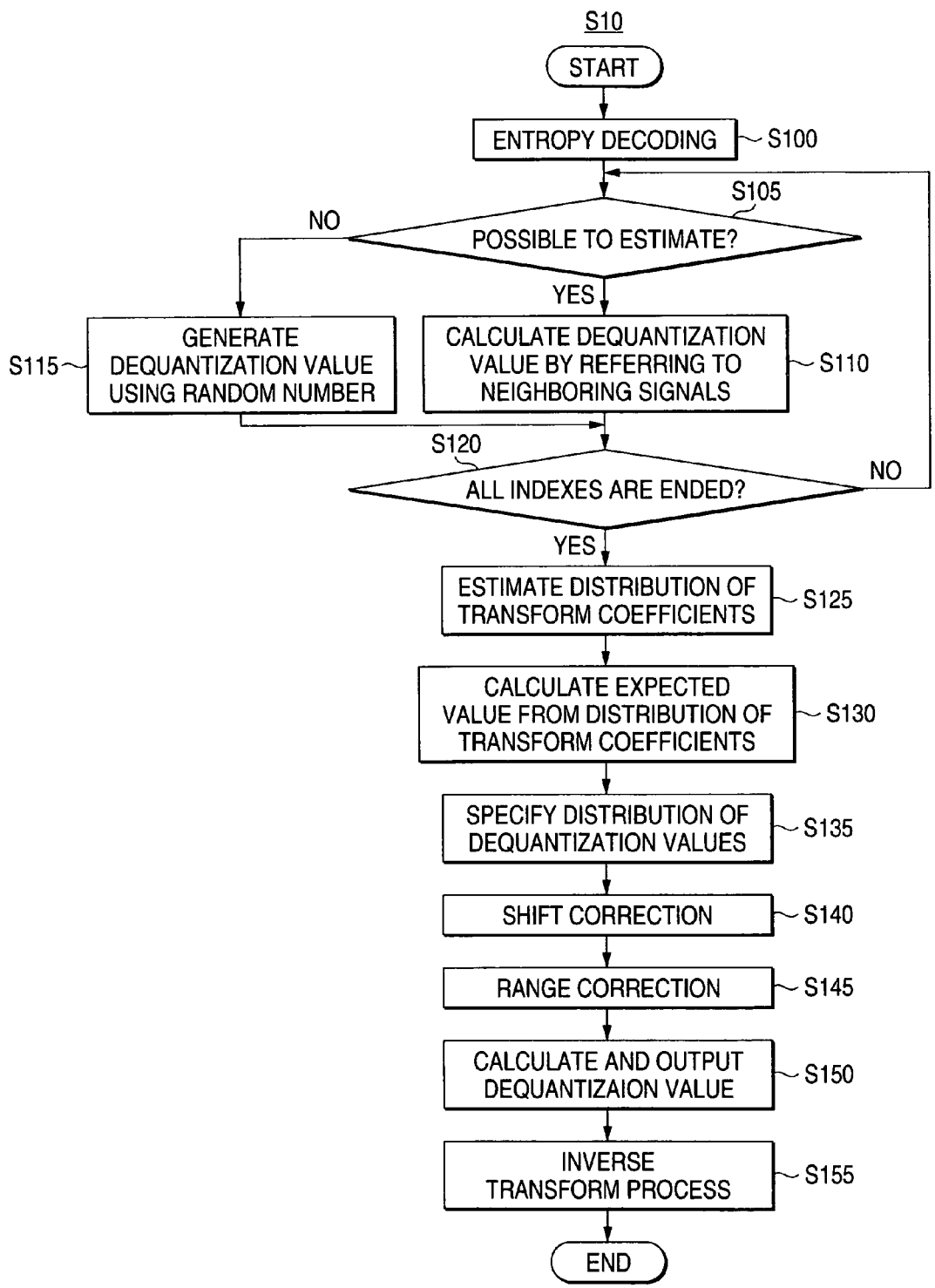

DECODING APPARATUS, DEQUANTIZING METHOD, AND PROGRAM THEREOF

BACKGROUND OF THE INVENTION

1. Field of the Invention

The invention relates to a decoding apparatus for decoding code data generated by an encoding process. More specifically, the invention relates to a decoding apparatus for dequantize code data generated by an encoding process including quantizing data, to decode the code data.

2. Description of the Related Art

Since images, audios or the like have enormous amount of data, it is common to reduce an amount of the data by compressing it and then storing or transmitting the compressed data. For example, an amount of multi-value image data generated when color documents or photographs are transformed into an electronic form by a scanner or when scenery is photographed by a digital camera can be significantly reduced by compressing the data using a lossy coding process such as JPEG, JPEG2000 or the like.

However, the lossy coding process causes coding distortion; this is a problem. In particular, the JPEG process has a problem in that block distortion occurs at DCT block boundaries of decoded images (coding distortion).

In this connection, a generation mechanism for the coding distortion of the lossy coding process will be first described.

FIGS. 1A and 1B are block diagrams schematically illustrating a transform coding method such as JPEG and JPEG2000, where FIG. 1A shows an outline of an encoding process and FIG. 1B shows an outline of a decoding process.

FIGS. 2A to 2C are diagrams illustrating a quantization process in the transform coding method. A transform coefficient $T(c, i, j)$ and a quantization index $Q(c, i, j)$ shown in FIGS. 1A and 1B are functions of variables c, i and j. The variable c is an index indicating a kind of transform coefficient. For example, in the case of the DCT transform using 8×8 blocks, the variable c is a value (an integer in a range of 1 to 64) indicating one of 64 (8×8) transform coefficients. In a case of the wavelet transform, the variable c is a value indicating one of components such as 1HH, 1LH, 1HL, 2HH, 2LH, 2HL, ..., NLL. In addition, the transform variables i and j are variables indicating positions of the transform coefficients, respectively. For example, in the case of the DCT transform, a c-th transform coefficient in a block located at an i-th row from the top and a j-th column from the left is indicated as $T(c, i, j)$. In the case of the wavelet transform, data of a c-th transform coefficient located at an i-th row from the top and a j-th column from the left is indicated as $T(c, i, j)$.

As shown in FIG. 1A, in an encoding process of the transform coding method, an input image G is subject to a transform process such as the discrete cosine transform (DCT) or the wavelet transform to generate a transform coefficient T of the input image G. The transform coefficient T is then quantized into a quantization index Q. The quantization index Q is subject to an entropy coding process (lossless coding process) to be a compression code F.

Here, the quantization index refers to information used to distinguish quantization values. In addition, the quantization value refers to a value to which a group of numerical values within a specific range (quantization interval) are degenerated. For example, as shown in FIGS. 2A to 2C, the quantization values are discrete values (−2×D(c) to 2×D(c) in this example) representing quantization intervals (A−2~A2), respectively.

Code data (the compression code F) generated in this way are entropy-decoded into a quantization index Q, as shown in FIG. 1B. This quantization index Q is equivalent to the quantization index Q in the encoding process.

Then, the quantization index Q is dequantized into a transform coefficient R (i.e., a dequantization value). Thereafter, the transform coefficient R is inversely transformed to generate a decoded image H.

Here, the dequantization value refers to a value, which is generated based on the quantization index or the quantization value and is used for decoding of data. For example, the dequantization value is a transform coefficient of the JPEG or JPEG2000 (transform coefficient being associated with a quantization index).

In the above-described process, coding distortion occurs during the quantization. In general, precision of the transform coefficient T of an original image is higher than that of the quantization index Q. Accordingly, the transform coefficient R reproduced by using the quantization index Q may be different from the original transform coefficient T. This is the cause of the coding distortion.

Next, the quantization and the dequantization will be described in detail with reference to FIGS. 2A to 2C.

The quantization is performed using a quantization step width $D(c)$ prepared for each transform coefficient c. The quantization step width $D(c)$ is a function of the kind of transform coefficient c. For example, in the case of JPEG, the quantization index Q is calculated according to the following equation in the quantization.

$$Q(c,i,j) = \text{round}(T(c,i,j)/D(c))$$

Where "round( )" is a function outputting an integer closest to an input value.

In addition, the dequantization value R is calculated according to the following equation in the dequantization.

$$R(c,i,j) = Q(c,i,j) \times D(c)$$

In the case of JPEG2000, the quantization index Q and the dequantization value R are calculated according to the following equations.

$$Q(c,i,j) = \text{sign}(T(c,i,j)) \times \text{floor}(|T(c,i,j)|/D(c))$$

$$R(c,i,j) = (Q(c,i,j)+r) \times D(c), \text{ if } Q(c,i,j) > 0$$

$$R(c,i,j) = (Q(c,i,j)-r) \times D(c), \text{ if } Q(c,i,j) < 0$$

$$R(c,i,j) = 0, \text{ if } Q(c,i,j) = 0$$

Where, "sign( )" is a function outputting positive sign or negative sign, "floor ( )" is a function nulling decimal places, and "||" is a symbol representing an absolute value.

In addition, "r" is a numerical value in a range of 0 to 1, typically r=0.5. In the JPEG2000 scheme, there may be a case where lower bits are not encoded. Here, a case where all bits including the least significant bit are encoded will be described by way of examples. Alternatively, in JPEG2000 scheme, it is possible to obtain a number of bits, which are not encoded in the encoding, from a code stream in the decoding. Accordingly, by shifting the quantization step width D to the left by the number of bits and setting the shifted quantization step width as a new quantization width, the JPEG2000 scheme may have the same operation as the JPEG scheme.

As shown in FIG. 2A, in the encoding process of the JPEG, transform coefficients T (before the quantization) generated by the transform process performed for the input image G are distributed on an X axis, which is a numerical straight line.

If a transform coefficient T exists in a quantization interval A0, the quantization index Q becomes 0 by the quantization process. Similarly, if a transform coefficient T exists in a quantization interval Aq, the quantization index Q becomes q.

Then, when the dequantization is performed for the quantization index Q, in a case in which the quantization index Q is 0, the dequantization value R of 0 is generated by the dequantization process. In a case in which the quantization index Q is 1, the dequantization value R of D(c) is generated.

Similarly, in the JPEG2000 scheme, as shown in FIG. 2B, if a transform coefficient T exists in a quantization interval Aq, the quantization index Q becomes q. Then, when the dequantization is performed for the quantization index Q, dequantization values corresponding to quantization indexes Q in a one-to-one manner are generated.

Here, for the sake of simplicity, only the quantization interval Aq in which the quantization index Q becomes q will be considered.

It is assumed that the transform coefficient T exists in the quantization interval Aq.

As shown in FIG. 2C, the quantization interval Aq has a range of d1 to d2. In this case, the transform coefficient T is included in the range of d1 to d2. In addition, it is assumed that a dequantization value of the transform coefficient T is R.

Under this condition, a transform coefficient for generating a decoded image is the dequantization value R. However, the transform coefficient T of an original image has any value within the range of d1 to d2 and is not always equivalent to the dequantization value R. At this time, a difference between the original transform coefficient T and the dequantization value R occurs. This difference is the cause of the coding distortion.

As described previously, the lossy coding process realizes a lossy data compression by degenerating a plurality of data values (original data values existing in each quantization interval) into one quantization value (a quantization value corresponding to each quantization interval), but at the same time, the coding distortion occurs due to the quantization.

In order to reduce this coding distortion, a parameter for reducing compression efficiency in the encoding process may be selected.

However, this causes a problem that encoding efficiency is reduced and the amount of data is increased.

Further, when previously encoded data is intended to be high-quality images, it is impossible to employ such a process in which the compression efficiency is reduced.

For this reason, various techniques have been suggested for overcoming the image distortion problem in the decoding process.

In a broad classification, there are two types of method, that is, a filtering method and a noise method. In the filtering method, a decoded image is subject to a low pass filtering process so as to make coding distortion faint and be conspicuous. In the noise method, noises are added to the decoded image or the transformation coefficient so as to make coding distortion faint and be conspicuous.

First, the method using the low pass filtering process (the filtering method) will be described.

For example, it is known to provide a method applying a low pass filter to only a boundary between DCT blocks in order to remove block distortion.

This method makes the coding distortion faint using the low pass filter so that it is difficult for this distortion to be discriminated.

However, this method has a problem in that edge components of an original image become faint as well.

In addition, it is known to provide a method, which prepares a plurality of low pass filters, determines as to whether or not edges are present in an image, and selectively applies a filter not to cause the edges to be faint, based on a determination result.

Next, the method of adding noises (the noise method) will be described.

For example, it is known to provide a method, which adds noises to DCT coefficients so as to make the coding distortion faint, when it is determined that distortion is noticeable in a region.

In this method, the coding distortion is considered to be noticeable when the region is determined to be a flat image region.

When a decoded image is generated from an encoded image (i.e., a decoding process is performed), it is a goal to approach the decoded image as close as possible to an original image before the original image is subject to an encoding process.

From this point of view, the methods according to prior art do not provide an optimal solution since faintness of the image by the low pass filter or addition of the noises does not approach the decoded image to the original image.

More specifically, these methods may have some side effects as follows.

(1) In the filtering method, signals in a high-frequency band of the decoded image are suppressed. Accordingly, when textures of high frequency components are present in the original image, it is impossible to reproduce these textures.

(2) In the filtering method, there may be a possibility of dullness of the edge due to a possibility of incorrect edge determination.

(3) In the noise method, there may be a possibility of textures occurring, which are not present in the original image, due to the addition of noises.

SUMMARY OF THE INVENTION

The invention was made in consideration of the circumstances described above. The invention provides a decoding apparatus for decoding code data more efficiently.

According to one aspect of the invention, a decoding apparatus includes a dequantization-value generating section, distribution-information acquiring section, and a correcting section. The dequantization-value generating section generates a plurality of dequantization values for each quantization index value. The distribution-information acquiring section acquires distribution information of original data corresponding to each quantization index. The correcting section corrects at least a portion of the dequantization values generated by the dequantization-value generating section, based on the distribution information acquired by the distribution-information acquiring section.

According to another aspect of the invention, a dequantizing method includes generating a plurality of dequantization values for each quantization index value corresponding to each quantization value, which is obtained when original data is quantized; acquiring distribution information of the original data corresponding to each quantization index; and correcting at least a portion of the plurality of generated dequantization values based on the acquired distribution information.

According to another aspect of the invention, a storage medium, which is readable by a computer, stores a program of instructions executable by the computer to perform a dequantization function comprising the steps of generating a plurality of dequantization values for each quantization index value corresponding to each quantization value, which is obtained when original data is quantized; acquiring distribution information of the original data corresponding to each quantization index; and correcting at least a portion of the plurality of generated dequantization values based on the acquired distribution information.

According to the decoding apparatus set forth above, code data can be decoded more efficiently.

BRIEF DESCRIPTION OF THE DRAWINGS

Embodiment of the invention will be described in detail based on the following figures, wherein:

FIG. 6A is a diagram schematically illustrating correction executed by an expected-value shifting section 584;

FIG. 6B is a diagram schematically illustrating corrections executed by an expected-value correcting section 586;

FIG. 7 is a flow chart illustrating a decoding process (S10) executed by the decoding program 5 shown in FIG. 4;

DETAILED DESCRIPTION OF THE PREFERRED EMBODIMENTS

Hereinafter, embodiments of the invention will be described.

In this embodiment, a case where code data encoded according to the JPEG is decoded will be described by way of examples. A decoding process to be described in this embodiment is approximately similar to that described in ITU-T Recommendation T. 81. However, the decoding process of this embodiment is different in a dequantization process from that of ITU-T Recommendation T. 81.

[Hardware Configuration]

First, a hardware configuration of the decoding apparatus 2 according to this embodiment will be described.

Figure 1A:
FIG. 1A is a block diagram schematically illustrating an encoding process of a transform coding method such as JPEG and JPEG2000.
Figure 1B:
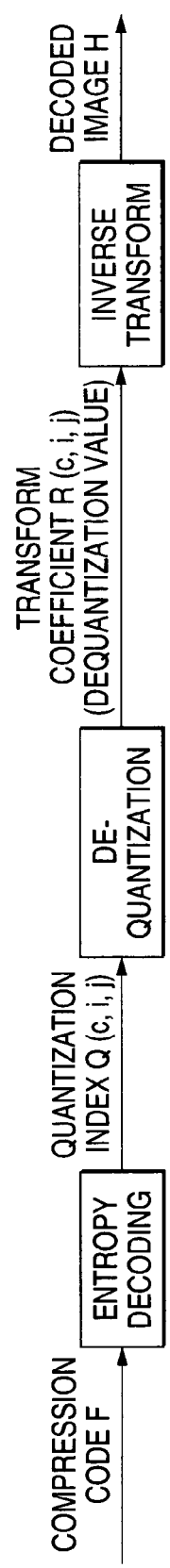
FIG. 1B is a block diagram schematically illustrating a decoding process of a transform coding method such as JPEG and JPEG2000.
Figure 2A:
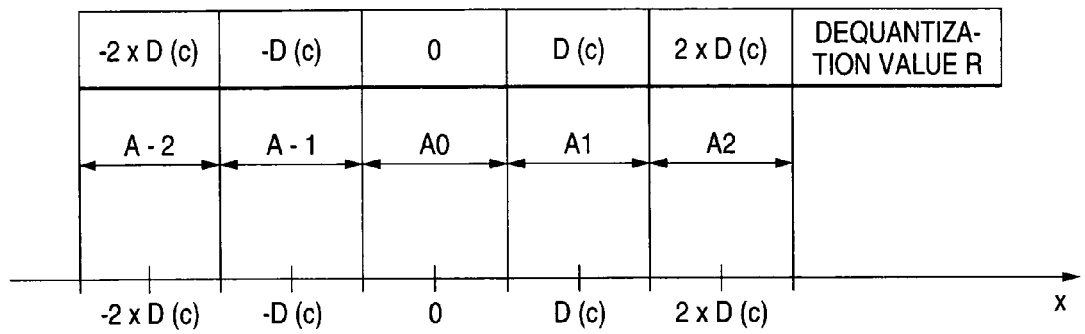
FIG. 2A is a diagram illustrating a quantization process in the transform coding method.
Figure 2B:
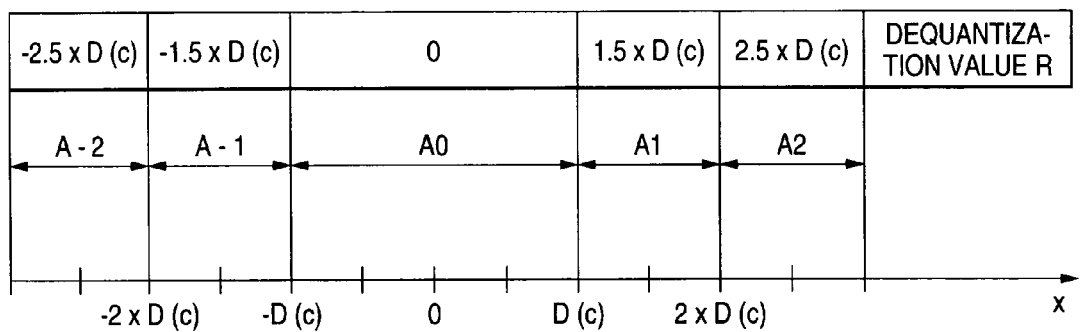
FIG. 2B is a diagram illustrating a quantization process in the transform coding method.
Figure 2C:
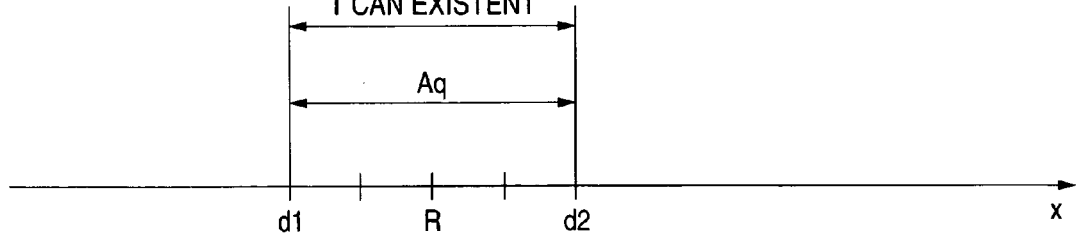
FIG. 2C is a diagram illustrating a quantization process in the transform coding method.
Figure 3:
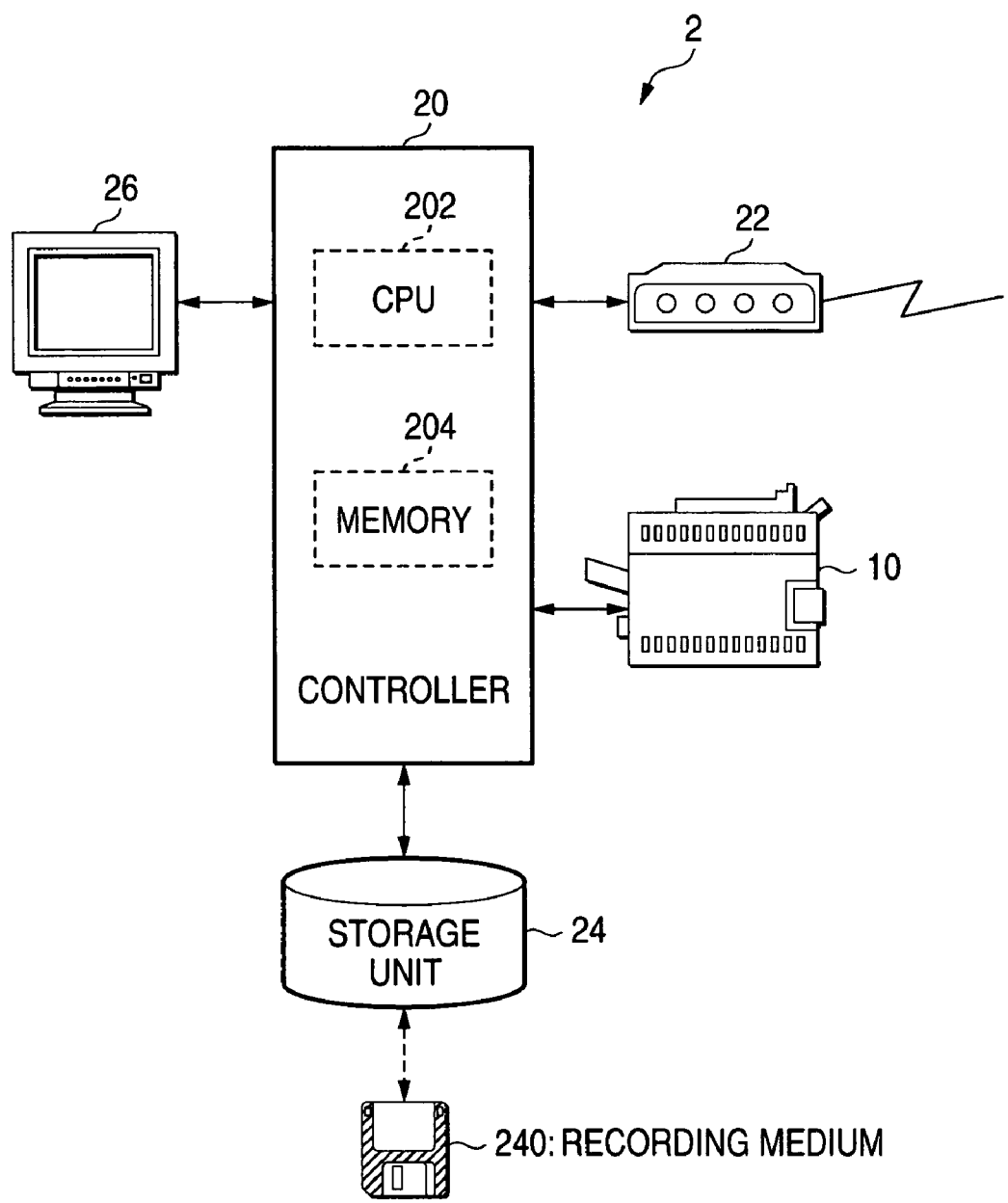
FIG. 3 is a diagram illustrating a hardware configuration of a decoding apparatus 2 to which a decoding method according to embodiments of the invention is applied, with providing a controller 20 centrally.

FIG. 3 is a diagram illustrating a hardware configuration of the decoding apparatus 2 to which a decoding method according to the invention is applied, with a controller 20 as the central figure.

As shown in FIG. 3, the decoding apparatus 2 includes a controller 20 including CPU 202, a memory 204 and the like, a communication unit 22, a storage unit 24 such as HDD, CD and the like, and a user interface unit (UI unit) 26 including an LCD display device or a CRT display device, a key board, a touch panel and the like.

The decoding apparatus 2 is a general-purpose computer in which a decoding program 5, which will be described later, is installed. The decoding apparatus 2 acquires code data through the communication unit 22, the storage unit 24 or the like and decodes the acquired code data.

[Decoding Program]

Figure 4:
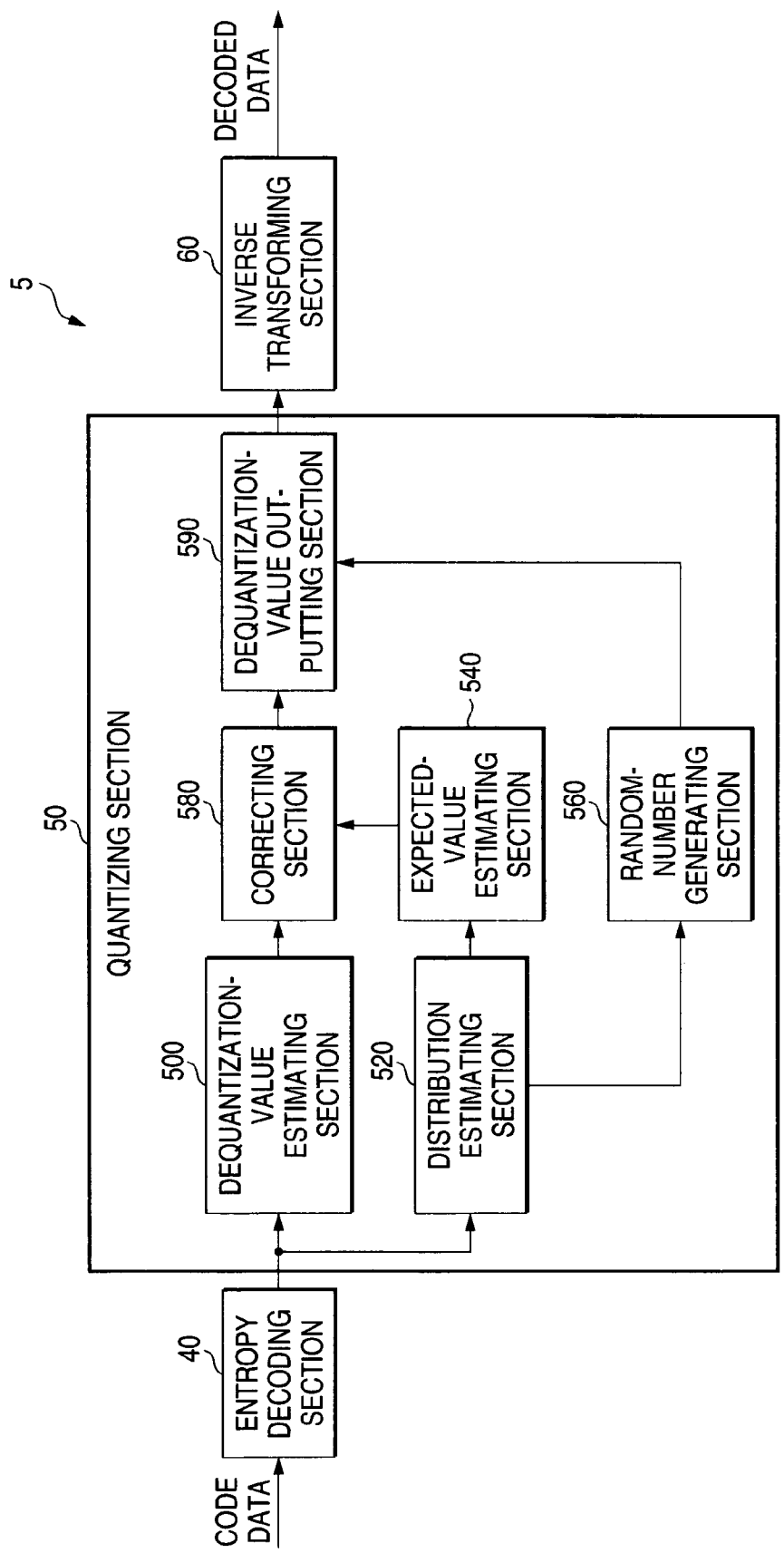
FIG. 4 is a diagram illustrating a functional configuration of a decoding program 5 executed by the controller 20 shown in FIG. 3, for implementing a decoding method according to the embodiments of the invention.

FIG. 4 is a diagram illustrating a functional configuration of the decoding program 5 executed by the controller 20 shown in FIG. 3, for implementing a decoding method according to embodiments of the invention.

As shown in FIG. 4, the decoding program 5 includes an entropy decoding section 40, a dequantizing section 50 and an inverse transforming section 60.

Also, the dequantizing section 50 includes a dequantization-value estimating section 500, a distribution estimating section 520, an expected-value estimating section 540, a random-number generating section 560, a correcting section 580, and a dequantization-value outputting section 590.

In the decoding program 5, the entropy decoding section 40 entropy-decodes input code data and outputs the decoded data to the dequantizing section 50.

The entropy decoding section 40 of this embodiment decodes the input code data to generate a quantization index Q and outputs the generated quantization index Q to the dequantizing section 50.

The dequantizing section 50 generates a dequantization value R based on the quantization index Q input from the entropy decoder 40 and outputs the generated dequantization value R to the inverse transforming section 60.

The inverse transforming section 60 performs an inverse transform based on the dequantization value R input from the dequantizing section 50 to generate a decoded image.

In the dequantizing section 50, the dequantization-value estimating section 500 (serving as dequantization-value estimating means) estimates a dequantization value based on the quantization index Q input from the entropy decoding section 40, and outputs the estimated dequantization value to the correcting section 580. That is, the dequantization-value estimating section 500 does not always generate a single dequantization value for one quantization index value, but can generate a plurality of different dequantization values for one quantization index value. In other words, although the dequantization-value estimating section 500 generates one dequantization value for each quantization index, the dequantization-value estimating section 500 does not necessarily generate the same dequantization value even when input quantization indexes have the same value.

The dequantization-value estimating section 500 of this embodiment calculates a correction factor α of the dequantization value R corresponding to the quantization index of a given block, based on the quantization index of the given block and the quantization index (limited to one having a quantization index of the same kind c as the transform coefficient) of another block adjacent to the given block, and outputs the calculated correction factor α to the correcting unit 580.

Further, in the following description, a correction factor α corresponding to each transform coefficient kind c and each quantization index q is denoted by αycq. In addition, assuming that the number of signals each having the transform coefficient kind c and the quantization index q is K, and that each correction factor is denoted by αycq(k) (where, k=1, 2, . . . , K).

The distribution estimating section 520 (serving as distribution-information generating means) estimates distribution of transform coefficients (of original data) based on a plurality of quantization indexes (or, dequantization values corresponding to the plurality of quantization indexes) input from the entropy decoding section 40, and then outputs distribution data representing the estimated distribution of transform coefficients to the expected-value estimating section 540 and the random-number generating section 560.

The distribution estimating section 520 in this example calculates the frequency distribution of quantization indexes for each transform coefficient kind c, and then generates the distribution data for each transform coefficient kind c based on the calculated frequency distribution.

The expected-value estimating section 540 (serving as distribution-information generating means or distribution-information acquiring means) calculates expected values of the dequantization values based on the distribution data input from the distribution estimating section 520, and then outputs the calculated expected values and the distribution data to the correcting section 580.

More specifically, the expected-value estimating section 540 calculates expected values for each quantization interval (that is, expected values for each quantization index value) based on the distribution data generated for each transform coefficient kind c.

When the transform coefficient kind is c and the quantization index Q(c, i, j) is equal to q, an expected value is indicated by E(αTcq). That is, the expected value E (αTcq) indicates estimated expected values of differences between the dequantization values R corresponding to the quantization indexes in a one-to-one manner and the original transform coefficients T corresponding to the quantization indexes.

The random-number generating section 560 generates random numbers according to the distribution data input from the distribution estimating section 520, and outputs the generated random numbers to the dequantization-value outputting section 590.

The correcting section 580 (serving as correction means) corrects the dequantization value (the correction factor α of the dequantization value in this example) input from the dequantization-value estimating section 500 based on the distribution data or the expected values input from the expected-value estimating section 540.

Further, the correcting section 580 corrects the dequantization value (the correction factor α of the dequantization value in this example) input from the dequantization-value estimating section 500 to be in a preset range (for example, in the case of the dequantization value, a quantization interval corresponding to the quantization index), and then outputs the corrected dequantization value (the correction factor α) to the dequantization-value outputting section 590.

The correcting section 580 in this example corrects the correction factor α input from the dequantization-value estimating section 500 based on the expected value input from the expected-value estimating section 540 such that the frequency distribution of quantization indexes calculated by the distribution estimating section 520 becomes approximately identical with the frequency distribution of dequantization values calculated by the dequantization-value estimating section 500 for each transform coefficient kind c and each quantization interval, and then linearly corrects the corrected correction factor α again to fall within a range of −0.5 to 0.5 in the JPEG.

The linear correction executed by the correcting section 580 is, for example, achieved by selecting the maximum value αmax and the minimum value αmin from among the correction factors α corresponding to the same quantization index and then by linearly transforming all the correction factors α such that the selected maximum value αmax and minimum value αmin fall within the preset range (the range of −0.5 to 0.5 in the JPEG).

Furthermore, the correcting section 580 may take the correction factors α as a boundary value of this range (i.e., one of −0.5 and 0.5, which is closer to α) if the correction factors α is outside the range of −0.5 to 0.5. Also, the correcting section 580 may take the correction factors α as 0 if the correction factors α is outside the range of −0.5 to 0.5.

In addition, the JPEG2000 is different from the JPEG only in the range of the correction factors α. That is, in the JPEG2000, the correcting section 580 corrects the correction factors α on the basis of a range of $0 \leq r+\alpha \leq 1$ if Q(c, i, j)>0, a range of $-1 \leq -r+\alpha \leq 0$ if Q(c, i, j)<0, and a range of $-1 \leq \alpha \leq 1$ if Q(c, i, j)=0, respectively.

The dequantization-value outputting section 590 determines a dequantization value to be applied by using the dequantization value (the correction factors α of the dequantization value in this example) input from the correcting section 580 or the random numbers input from the random-number generating section 560, and then outputs the determined dequantization value to the inverse transforming section 60.

The dequantization-value outputting section 590 in this example calculates the dequantization value based on the correction factors α input from the correcting section 580 or the random-number generating section 560 and the quantization index (or the dequantization value associated with the quantization index). More specifically, the dequantization-value outputting section 590 calculates the dequantization value Ry(c, i, j) to be applied, using the following equation.

$$Ry(c,i,j)=\{Q(c,i,j)+\alpha(c,i,j)\} \times D(c)$$

[Correcting Section]

Figure 5:
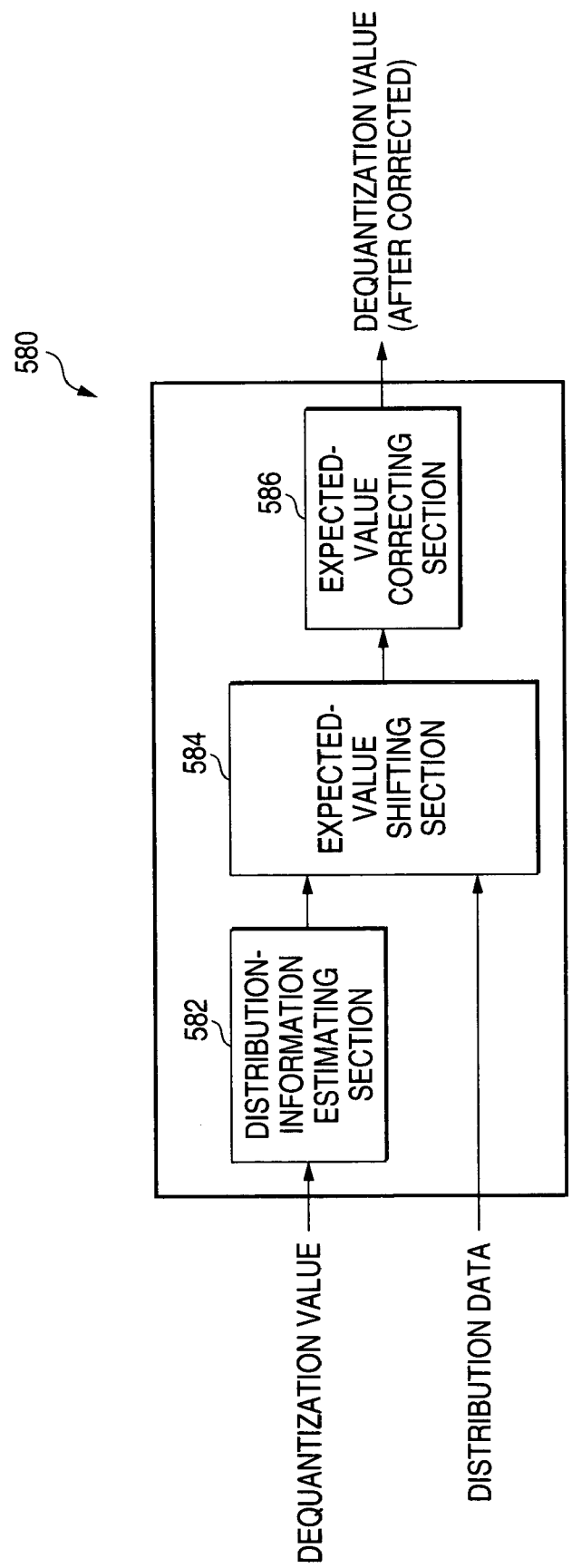
FIG. 5 is a diagram illustrating details of a correcting section 580 shown in FIG. 4.

FIG. 5 is a diagram illustrating details of the correcting section 580 (FIG. 4).

As shown in FIG. 5, the correcting section 580 includes a distribution-information specifying section 582, an expected-value shifting section 584, and an expected-value correcting section 586.

In the correcting section 580, the distribution-information specifying section 582 calculates a mean value, the minimum value and the maximum value of the dequantization values (the correction factors α in this example) input from the dequantization-value estimating section 500 for each transform coefficient kind and each quantization index value, and then outputs the calculated mean value, minimum value and maximum value, along with the input dequantization value, to the expected-value shifting section 584.

Hereinafter, the mean value, minimum value and maximum value calculated by the distribution-information specifying section 582 will be indicated by αycqMean, αycqMin and αycqMax, respectively. These values are calculated for each combination of the transform coefficient kind c and the quantization index q, and processes of the expected-value shifting section 584 and the expected-value correcting section 586, to be described below, are also executed for each combination of the transform coefficient kind c and the quantization index q.

The expected-value shifting section 584 performs the following calculation by using the correction factor αycq(k) and the mean value αycqMean of the correction factor input from the distribution-information specifying section 582 and the estimated expected value E(αTcq) input from the expected-value estimating section 540 (FIG. 4) to calculate a correction factor αxcq1(k) after the shift correction.

$\alpha xcq1(k)=\alpha ycq1(k)+E(\alpha Tcq)-\alpha ycq\text{Mean}$

The above process is performed with respect to k (=1, 2, ..., K).

Further, the expected-value shifting section 584 also shifts the maximum value and the minimum value, in a similar manner.

That is, the expected-value shifting section 584 calculates the minimum value αycqMin1 and the maximum value αycqMax1 after the shift correction by performing the following calculation.

$\alpha ycq\text{Min1}=\alpha xcq\text{Min}+E(\alpha Tcq)-\alpha ycq\text{Mean}$ $\alpha ycq\text{Max1}=\alpha xcq\text{Max}+E(\alpha Tcq)-\alpha ycq\text{Mean}$ The expected-value correcting section 586 performs a range correction such that all of the correction factors αxcq1(k) after the shift correction fall within a range of $-0.5 \leq \alpha \leq 0.5$. Here, the range correction refers to correction allowing a group of numerical values to fall within a specific range.

Specifically, the expected-value correcting section 586 making a range of the correction factors αxcq1 after the shift correction to be the specific range (αmin~αmax) without changing the mean value of the correction factors αxcq1.

The expected-value correcting section 586 in this example achieves the range correction according to the following processes.

$\alpha xcq2(k)=\alpha xcq1(k)$, when $\alpha ycq\text{Max1} \leq \alpha\text{max}$ and $\alpha\text{min} \leq \alpha ycq\text{Min1}$ \hfill (1)

Otherwise, the following process is performed.

$V1=(E(\alpha Tcq)-\alpha\text{min})/(E(\alpha Tcq)-\alpha ycq\text{Min1})$ $V2=(\alpha\text{max}-E(\alpha Tcq))/(\alpha ycq\text{Max1}-E(\alpha Tcq))$ V=V1, when V1≤V2

Otherwise, V=V2

$\alpha xcq2(k)=V(\alpha xcq1(k)-E(\alpha Tcq))+E(\alpha Tcq)$ \hfill (2)

According to the above range correction, the expected-value correcting section 586 obtains the correction factors αxcq2(k) after the range correction.

FIGS. 6A and 6B are diagrams schematically illustrating corrections by the expected-value shifting section 584 and the expected-value correcting section 586.

As shown in FIG. 6A, the expected-value shifting section 584 shifts (as shown in (a3) of the figure) the distribution of dequantization values to make an estimated expected value of the transform coefficient T (as shown in (a1) of the figure) equal to an expected value of the dequantization value (as shown in (a2) of the figure).

Further, as shown in FIG. 6B, if the distribution of dequantization values (the correction factors α in this example) deviates from a quantization interval d1 to d2 (the range αmin ~αmax of α in this example) (as shown in (b1) of the figure), the expected-value correcting section 586 reduces the distribution of dequantization values toward the expected value of the dequantization value in such a manner that the expected value is not changed (as shown in (b2) of the figure).

Furthermore, although the expected-value shifting section 584 and the expected-value correcting section 586 perform the correction processes in a separate manner in this example, the correction processes may be integrated in to a single correction process.

The following is one example of a combination of the shift correction and the range correction.

$\alpha ycq\text{Min1}=\alpha xcq\text{Min}+E(\alpha Tcq)-\alpha ycq\text{Mean}$ $\alpha ycq\text{Max1}=\alpha xcq\text{Max}+E(\alpha Tcq)-\alpha ycq\text{Mean}$ $\alpha xcq(k)=\alpha xcq1(k)$, when $\alpha ycq\text{Max1} \leq \alpha\text{max}$ and $\alpha\text{min} \leq \alpha ycq\text{Min1}$ \hfill (1)

Otherwise, the following process is performed.

$V1=(E(\alpha Tcq)-\alpha\text{min})/(\alpha xcq\text{Mean}-\alpha ycq\text{Min})$ $V2=(\alpha\text{max}-E(\alpha Tcq))/(\alpha ycq\text{Max}-\alpha xcq\text{Mean})$ V=V1, when V1≤V2

Otherwise, V=V2

$\alpha xcq(k)=V(\alpha xcq1(k)-\alpha ycq\text{Mean})+E(\alpha Tcq)$ \hfill (2)

In addition, the above process (1) may be omitted.

Moreover, this calculation is performed such that the input of αycqMean is E(αTcq) and the input of αycqMin or αycqMax is αmin or αmax.

[Entire Operation]

Next, the entire operation of the decoding apparatus 2 (the decoding program 5) will be described.

FIG. 7 is a flowchart of a decoding process (S10) executed by the decoding program 5 shown in FIG. 4. In this example, a case where the code data (of the JPEG) of image data is input will be described by way of examples.

As shown in FIG. 7, in Step S100, the entropy decoding section 40 (FIG. 4) decodes the input code data to generate the quantization indexes of each block (8×8 block) and outputs the generated quantization indexes of each block to the dequantizing section 50.

In Step S105, the dequantizing section 50 (FIG. 4) sets the input quantization indexes as given quantization indexes in order, and determines as to whether or not dequantization values for the given quantization indexes can be estimated. For example, if the given quantization indexes are equal to all neighboring quantization indexes (quantization indexes of neighboring blocks), the dequantizing section 50 determines that it is impossible to estimate a dequantization value. Otherwise, the dequantizing section 50 determines that it is possible to estimate the dequantization value. Otherwise, the dequantizing section 50 determines that it is possible to estimate a dequantization value.

If the dequantizing section 50 determines that it is possible to estimate the dequantization value, the decoding program 5 proceeds to step S105. If the dequantizing section 50 determines that it is impossible to estimate the dequantization value, the decoding program 5 proceeds to step S115.

In step S110, the dequantization-value estimating section 500 (FIG. 4) extracts the quantization indexes Q(c, i+m, j+n) (−1≤m≤1 and −1≤n≤1 in this example) in the neighborhood of the given quantization index Q(c, i, j), and calculates a correction factor αycq corresponding to the given quantization index Q (c, i, j) based on the extracted neighboring quantization indexes Q(c, i+m, j+n) and the given quantization index Q(c, i, j). The extracted neighboring quantization indexes are quantization indexes having the transform coefficient kind c in 3×3 blocks around a given block and are expressed by a 3×3 matrix.

More specifically, the dequantization-value estimating section 500 generates a difference matrix P by performing the following calculation using the extracted neighboring quantization indexes Q(c, i+m, j+n) and the given quantization index Q(c, i, j).

$$P(m,n)=Q(c,i+m,j+n)-Q(c,i,j)$$

Next, the dequantization-value estimating section 500 compares the absolute value |P(m, n)| of each difference value included in the difference matrix P with a threshold TH, and then sets a difference value P(m, n) larger than the threshold TH as 0 (threshold process).

Next, the dequantization-value estimating section 500 calculates the correction factor $\alpha ycq$, using a 3×3 filter kernel K(m, n), by performing a convolution operation for the difference matrix P for which the threshold process has been performed. Accordingly, although the values of given quantization indexes are the same, if neighboring quantization indexes are different, the calculated correction factors $\alpha ycq$ have different values.

In step S115, the distribution estimating section 520 estimates the distribution of transform coefficients based on the plurality of quantization indexes input from the entropy decoding section 40, and then outputs distribution data representing the estimated distribution to the random-number generating section 560.

The random-number generating section 560 generates random numbers according to the distribution data input from the distribution estimating section 520, and then outputs the generated random numbers to the dequantization-value outputting section 590 as the correction factor $\alpha$.

In step S120, the dequantizing section 50 determines as to whether or not the correction factors $\alpha$ are generated for all quantization indexes. If the dequantizing section 50 determines that the correction factors $\alpha$ are generated for all quantization indexes, the process proceeds to step S125. Otherwise, the process returns to step 105 where the next quantization index is taken as a given quantization index to be processed.

In step S125, the distribution estimating section 520 estimates the distribution of transform coefficients for each transform coefficient kind c based on all quantization indexes input from the entropy decoding section 40, and then outputs the distribution data representing the estimated distribution to the expected-value estimating section 540.

In step S130, the expected-value estimating section 540 calculates an expected value $E(\alpha Tcq)$ for each combination of the transform coefficient kind c and the quantization index based on the distribution data input from the distribution estimating section 520, and then outputs the calculated expected value $E(\alpha Tcq)$ to the correcting section 580.

In step S135, the distribution-information specifying section 582 (FIG. 5) of the correcting section 580 classifies the correction coefficients $\alpha ycq$ calculated by the dequantization-value estimating section 500 for each transform coefficient kind and each quantization index, calculates the minimum value, the maximum value and a mean value of the classified correction coefficients $\alpha ycq$, and outputs the calculated minimum value, maximum value and mean value to the expected-value shifting section 584.

In step S140, the expected-value shifting section 584 (FIG. 5) compares the expected value $E(\alpha Tcq)$ input from the expected-value estimating section 540 with the mean value input from the distribution-information specifying section 582 for each combination of the transform coefficient kind and the quantization index, and shifts a group of correction coefficients $\alpha ycq$, which are classified in accordance with the combination of the transform coefficient kind and the quantization index, such that the expected value $E(\alpha Tcq)$ becomes equal to the mean value.

In step S145, the expected-value correcting section 586 (FIG. 5) determines as to whether or not the group of correction coefficients $\alpha ycq$, for which the shift correction has been made by the expected-value shifting section 584, falls within the range of −0.5 to 0.5. If the expected-value correcting section 586 determines that the group of correction coefficients $\alpha ycq$ does not fall within the range, the expected-value shifting section 586 performs the range correction to make the range of the group of correction coefficients $\alpha ycq$ fall within the range of −0.5 to 0.5 without changing the mean value of the group of correction coefficients $\alpha ycq$.

In step S150, the dequantization-value outputting section 590 (FIG. 4) calculates a dequantization value Ry to be applied, based on the given quantization index Q and the correction factor $\alpha ycq$ input from the expected-value correcting section 586 (or, the correction factor $\alpha$ input from the random-number generating section 560), and then outputs the calculated dequantization value Ry to the inverse transforming section 60.

Specifically, the dequantization-value outputting section 590 in this example calculates the dequantization value Ry in accordance with the following calculation.

$$Ry(c,i,j)=\{Q(c,i,j)+\alpha(c,i,j)\}\times D(c)$$

In step S155, the inverse transforming section 60 (FIG. 4) performs an inverse transform (the inverse DCT transformation in this example) using the dequantization value (approximate transform coefficient) input from the dequantizing section 50 to generate a decode image H.

[Distribution Estimation Process]

Next, the distribution estimation process (step S125) having been described with reference to FIG. 7 will be described in more detail.

Hereinafter, the distribution estimation process (step S125) executed by the distribution estimating section 520 will be described in order.

First, the distribution estimating section 520 acquires a histogram hc(q) of the quantization indexes Q(c, i, j) for each transform coefficient kind c.

Next, the distribution estimating section 520 estimates the distribution of transform coefficients of the transform coefficient kind c.

That is, the distribution estimating section 520 estimates a probability density function of the transform coefficients T(c, i, j) based on the histogram hc(q) of the quantization indexes Q(c, i, j).

The estimation of the probability density function of the transform coefficients T(c, i, j) is achieved by the linear approximation and the Laplace distribution approximation.

Figure 8A:
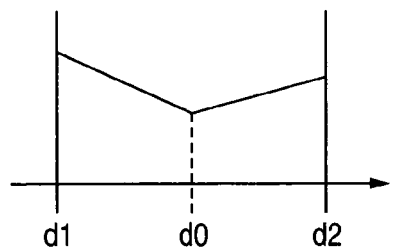
FIG. 8A is a diagram explaining a first broken line approximation.

Specifically, in the linear approximation, if a value of the transform coefficient T falls within a range of d1 to d2 and the quantization index is q, the probability density function is approximated by a line (polygonal line) connecting among points d1, d0 and d2 where d0 is a midpoint between d1 and d2, as shown in FIG. 8A. Here, as described above, T can be represented as follows:

$T(c,i,j) = R(c,i,j) + \alpha \times D(c) (\alpha\min \leq \alpha \leq \alpha\max)$ Hereinafter, an estimation through the approximation of the probability density function by the line (polygonal line) connecting among points αmin, αmid, and αmax where αmid is defined as (αmin+αmax)/2, will be described by way of an example.

Further, when the quantization index value q has an AC component and approaches to 0, since the linear approximation is difficult to be achieved, the Laplace distribution approximation is employed. Here, assuming that a threshold having positive integer is TH1, the distribution estimating section 520 performs an approximation process divided as follows depending on a value of |q|.

A first linear approximation is performed when |q|>TH1.

A second linear approximation is performed when |q|=TH1.

The Laplace approximation is performed when |q|<TH1.

To begin with, the first linear approximation will be described.

Figure 8B:
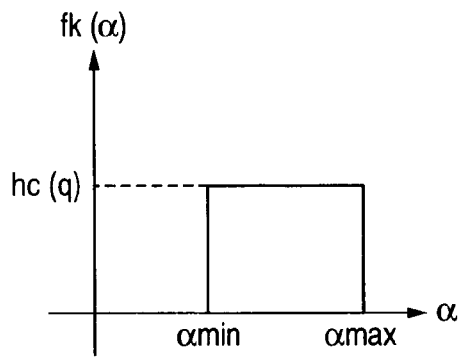
FIG. 8B is a diagram explaining the first broken line approximation.

First, as shown in FIG. 8B, the following function fk(α) is considered.

$fk(\alpha) = hc(q), \alpha\min \leq \alpha \leq \alpha\max$

This uniform function is then approximated to a polygonal line.

Figure 8C:
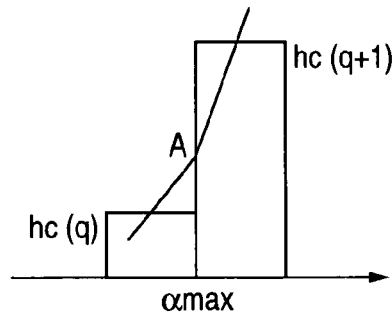
FIG. 8C is a diagram explaining the first broken line approximation.

Next, values of fk(αmin) and fk(αmax) are estimated using neighboring histograms hc(q−1) and hc(q+1). For example, a value of fk(αmax) is estimated. A position of a point A shown in FIG. 8C is determined.

It is reasonable that the value of fk(αmax) is set between hc(q) and hc(q+1). For example, fk(αmax)=(hc(q)+hc(q+1))/2.

In this example, a point internally dividing an interval between hc(q) and hc(q+1) with a ratio of hc(q):hc(q+1) is employed as the position of point A.

This is preferable because a value of point A can become sufficiently small when hc(q) is less than hc(q+1) or a value of hc(q) approaches zero.

At this time, fk(αmax) can be obtained as follows:

$fk(\alpha\max) = 2 \times hc(q) \times hc(q+1)/(hc(q)+hc(q+1))$

Similarly, fk(αmin) can be obtained as follows:

$fk(\alpha\min) = 2 \times hc(q) \times hc(q-1)/(hc(q)+hc(q-1))$

Next, a value of fk(αmid) is estimated. Here, shapes of the neighboring histograms are classified into two kinds, which are shown in FIGS. 8D and 8E, respectively.

Figure 8D:
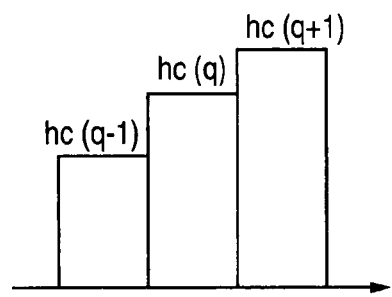
FIG. 8D is a diagram explaining the first broken line approximation.
Figure 8E:
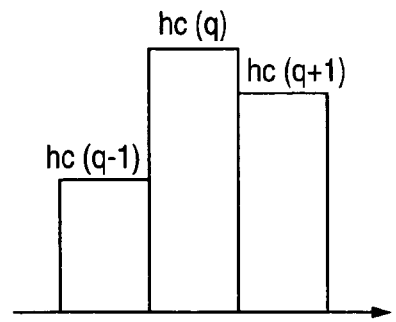
FIG. 8E is a diagram explaining the first broken line approximation.

As shown in FIG. 8D, when the value of fk(αmid) increases or decreases monotonously with respect to the quantization index value q, $fk(\alpha\mathrm{mid}) = hc(q)$ Further, as shown in FIG. 8E, when the value of fk(αmid) does not increase or decrease monotonously with respect to the quantization index value q, it is preferable that:

$fk(\alpha\mathrm{mid}) > hc(q)$, when hc(q) has the maximum value (peak), and $fk(\alpha\mathrm{mid}) < hc(q)$, when hc(q) has the minimum value (valley).

Then, a mean value of a difference between fk(αmin) and hc(q) and a difference between fk(αmax) and hc(q) is added to hc(q). That is, $fk(\alpha\mathrm{mid}) = hc(q) + (hc(q) - fk(\alpha\min) + hc(q) - fk(\alpha\max))/2 = 2 \times hc(q) - (fk(\alpha\min) + fk(\alpha\max))/2$ Alternatively, without dividing the quantization index value q into the monotonous increase and decrease, it may be always assumed that:

$fk(\alpha\mathrm{mid}) = 2 \times hc(q) - (fk(\alpha\min) + fk(\alpha\max))/2$

As described above, the polygonal-line approximation as shown in FIG. 8A is possible.

Furthermore, the expected-value estimating section 540 calculates the expected value E(αTcq) based on the polygonal-line approximation. More specifically, the expected-value estimating section 540 calculates the expected value E(αTcq) using the following equation.

$$E(\alpha Tcq) = \left\{ \int_{\alpha\min}^{\alpha\max} x fk(x) d\alpha \right\} / \left\{ \int_{\alpha\min}^{\alpha\max} fk(x) dx \right\} \quad (1)$$

Next, the Laplace distribution approximation will be described.

The Laplace distribution equation can be represented as follows.

$$L(x) = \frac{1}{\sqrt{2}\,\sigma} \exp\left( \frac{-\sqrt{2}\,|x|}{\sigma} \right) \quad (2)$$

In order to estimate a shape of the Laplace distribution, σ in the above equation is estimated.

First, the distribution estimating section 520 calculates the probability density function fhc(x) from the histogram hc(q) according to the following equation.

$$fhc(x) = \frac{hc(q)}{D(c) \times \sum_q hc(q)} \quad (3)$$

In the above equation, (q−0.5)×D(c)<x≤(q+0.5)×D(c), where q is an integer.

Figure 9:
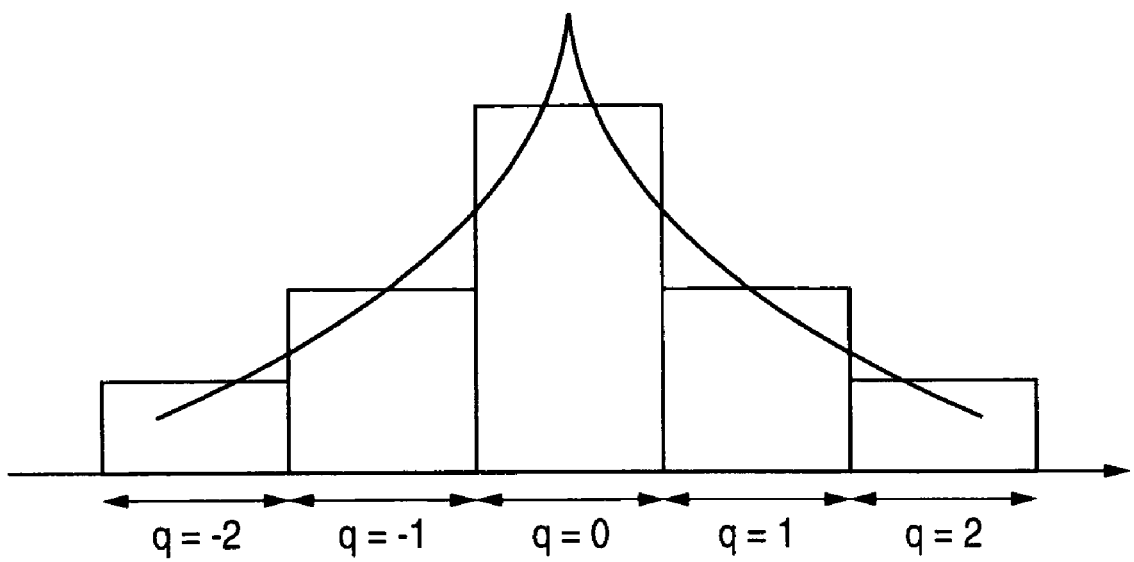
FIG. 9 is a diagram explaining an approximation using the Laplace distribution.

As shown in FIG. 9, σ to make a difference between approximation equation L(x) by the Laplace distribution and the probability density function fhc(x) as small as possible may be obtained.

As a function to estimate "making the difference as small as possible", the following error function Err(σ) is defined.

$$Err(\sigma) = \sum_q \left| \int_{(q-0.5) \times D(c)}^{(q+0.5) \times D(c)} \{L(x) - fhc(x)\} dx \right| \quad (4)$$

The error function Err(σ) is a function to add an absolute value of a difference of areas of the probability density functions obtained for the quantization indexes q. It can be said that the smaller value of Err(σ) is, the more approximate fhc(x) and L(x) are to each other.

The distribution estimating section 520 obtains σ, which minimizes Err(σ), through a numerical calculation.

Alternatively, the distribution estimating section 520 may obtain σ by simply calculating a standard deviation of Q(c, i, j) for each transform coefficient kind c.

Next, the Laplace approximation when |q|<TH1 will be described.

If TH1=2, the Laplace approximation is made when q=0, 1, and −1 in the distribution shown in FIG. 9.

Even in this case, the expected-value estimating section 540 calculates the expected value E(αTcq) using the above equation. Here, the function fk( ) is derived from not the polygonal line but the Laplace distribution according to the following equation.

$$fk(x) = L((x+q) \times D(c)) = \frac{1}{\sqrt{2}\,\sigma} \exp\left(\frac{-\sqrt{2}\,|(x+q) \times D(c)|}{\sigma}\right) \quad (5)$$

In addition, for example, if TH1=1, the Laplace approximation is made when q=0. Since the Laplace distribution in the range of q=0 is bilaterally symmetrical, it can be assumed that E(αTcq)=0.

Next, the second linear approximation will be described.

The second linear approximation is a linear approximation when |q|=TH1.

When q=TH1, since the left side (a case of q=TH1−1) is approximated to the Laplace distribution unlike the first linear approximation, it is desirable that values of fk(αmin) be considered to satisfy continuity of the distribution.

Figure 10:
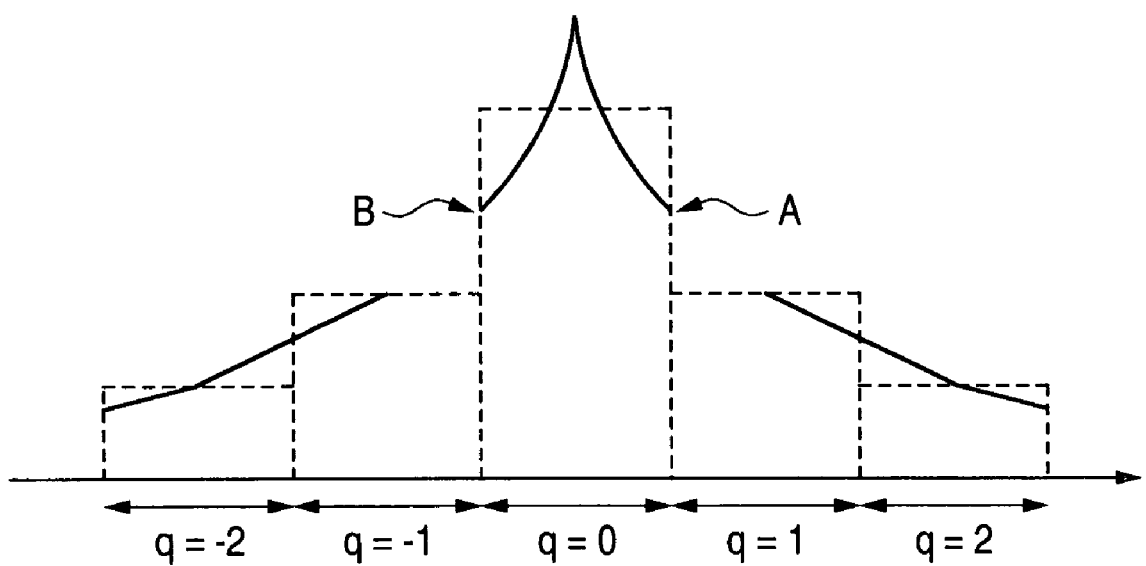
FIG. 10 is a diagram explaining a second linear line approximation.

FIG. 10 is a diagram illustrating the second linear approximation.

FIG. 10 shows a case where the threshold TH1=1. Accordingly, the Laplace approximation is made when q=0. Moreover, the first linear approximation is made when q=2. At that time, it is possible to make the probability density function be continuous by passing an approximation curve of the probability density function through a point A shown in FIG. 10.

Accordingly, the following equation can be established.

$$fk(\alpha\min) = L((\alpha\min + q) \times D(c)) \quad (6)$$
$$= \frac{1}{\sqrt{2}\,\sigma} \exp\left(\frac{-\sqrt{2}\,|(\alpha\min + q) \times D(c)|}{\sigma}\right)$$

fk(αmax) and fk(αmid) are calculated in the same manner as the first linear approximation. In addition, by using three numerical values, fk(αmin), fk(αmax) and fk(αmid), the expected value E(αTcq) can be calculated in the same manner as the first linear approximation.

When q=−TH1, since the right side (a case of q=TH1−1) is approximated to the Laplace distribution, it is desirable that values of fk(αmax) be considered to satisfy continuity of the distribution. Similarly, since it is necessary to make the probability density function be continuous by passing an approximation curve of the probability density function through a point B shown in FIG. 10, the following equation can be established.

$$fk(\alpha\max) = L((\alpha\max + q) \times D(c)) \quad (7)$$
$$= \frac{1}{\sqrt{2}\,\sigma} \exp\left(\frac{-\sqrt{2}\,|(\alpha\max + q) \times D(c)|}{\sigma}\right)$$

fk(αmin) and fk(αmid) are calculated in the same manner as the first linear approximation. Further, by using three numerical values, fk(αmin), fk(αmax) and fk(αmid), the expected value E(αTcq) can be calculated in the same manner as the first linear approximation.

As described above, the decoding apparatus 2 according to the embodiment corrects a plurality of different dequantization values based on the distribution of quantization indexes when the plurality of different dequantization values are generated for a single quantization index.

Specifically, the decoding apparatus 2 can obtain decoded data with higher reproducibility by estimating the distribution of transform coefficients T based on the distribution of quantization indexes and by correcting the calculated dequantization values such that the estimated distribution of transform coefficients T becomes identical with the distribution of calculated dequantization values.

[First Modification]

Although the expected value has been estimated, shifted, and corrected for each quantization index q and each transform coefficient kind c in the above embodiment, the invention is not limited thereto. For example, an expected value of α common to all quantization indexes q may be used.

In the first modification, a case where an expected value common to all quantization indexes q is used will be described. However, when such an expected value is commonly used, an expected value of α is set to 0 only when q=0. In addition, this case is applied only to an AC component.

Symmetry of distribution of AC components is used to generate a single expected value common to all quantization index values q. Specifically, the generation of the single expected value uses a fact that, if an expected value of the correction factor α is E(α) when the quantization index values q are positive values, an expected value of the correction factor α can be approximated to −E(α) when the quantization index values q are negative values.

First, the decoding program 5 transforms αy as follows:

αy=−αy, when Q(c,i,j)<0

Here, assuming that the number of signals having the transform coefficient kind c and the quantization index q is p(c, q), a weight average is determined by using the number of signals p(c, q) in order to calculate an expected value E(αTc) common to all quantization indexes q.

That is, to cope with a case of q<0, the expected-value estimating section 540 first transforms E(αTcq) as follows:

E(αTcq)=−E(αTcq), when q<0

Next, the expected-value estimating section 540 calculates expected value E(αTc) according to the following equation.

$$E(\alpha Tc) = \frac{\sum_{q \neq 0} P(c,q) \times E(\alpha Tcq)}{\sum_{q \neq 0} P(c,q)} \quad (8)$$

Next, αx is obtained through the same calculation as the above embodiment.

Finally, the dequantization-value outputting section 590 obtains the dequantization values Rx(c, i, j) according to the follow calculation.

Rx(c,i,j)=R(c,i,j)+α×D(c), when Q(c,i,j)≦0

Rx(c,i,j)=R(c,i,j)−α×D(c), when Q(c,i,j)>0

Further, when this modification is applied, the distribution-information specifying section 582 (FIG. 5) is required to calculate a mean value αycMean, the minimum value αycMin and the maximum value αycMax for each transform coefficient kind c.

[Second Modification]

Furthermore, an expected value of α common to all transform coefficient kinds c may be used.

In the second modification, a case where an expected value of α common to all transform coefficient kinds c is used will be described.

Assuming that the number of signals having the transform coefficient kind c and the quantization index q is p(c, q), a weight average is determined by using the number of signals p(c, q) in order to calculate an expected value E(αTq) common to all transform coefficient kinds c.

That is, the expected-value estimating section 540 calculates E(αTq) according to the following equation.

$$E(\alpha Tq) = \frac{\sum_c p(c, q) \times E(\alpha Tcq)}{\sum_c p(c, q)} \quad (9)$$

In addition, the dequantization values are obtained through the same calculation as the above embodiment.

Also, in this modification, the distribution-information specifying section 582 (FIG. 5) is required to calculate a mean value αyqMean, the minimum value αyqMin and the maximum value αyqMax for each quantization index q.

[Third Modification]

Further, an expected value of α common to all quantization indexes q and all transform coefficient kinds c may be used.

In the third modification, a case where an expected value common to all quantization indexes q and all transform coefficient kinds c is used will be described. However, when such an expected value is commonly used, an expected value of α is set to 0 only when q=0. Also, this case is applied only to an AC component.

Symmetry of distribution of AC components is used to generate a single expected value common to all quantization index values q. Specifically, the generation of the single expected value uses a fact that, if an expected value of the correction factor α is E(α) when the quantization index values q are positive values, an expected value of the correction factor α can be approximated to −E(α) when the quantization index values q are negative values.

First, the decoding program 5 transforms αy as follows:

αy=−αy, when $Q(c,i,j)<0$

Here, assuming that the number of signals having the transform coefficient kind c and the quantization index q is p(c, q), a weight average is determined by using the number of signals p(c, q) in order to calculate an expected value E(αT) common to all transform coefficient kinds c and all quantization indexes q.

That is, to cope with a case of q<0, the expected-value estimating section 540 first transforms E(αT) as follows:

$E(\alpha T) = -E(\alpha T)$, when $q<0$

Next, the expected-value estimating section 540 calculates expected value E(αTc) according to the following equation.

$$E(\alpha T) = \frac{\sum_c \sum_{q \neq 0} p(c, q) \times E(\alpha Tcq)}{\sum_c \sum_{q \neq 0} p(c, q)} \quad (10)$$

In addition, αx is obtained through the same calculation as the above embodiment.

Finally, the dequantization-value outputting section 590 obtains the dequantization values Rx(c, i, j) according to the follow calculation.

$Rx(c,i,j)=R(c,i,j)+\alpha \times D(c)$, when $Q(c,i,j) \leq 0$ $Rx(c,i,j)=R(c,i,j)-\alpha \times D(c)$, when $Q(c,i,j)>0$ Further, in this modification, the distribution-information specifying section 582 is required to calculate a mean value αyMean, the minimum value αyMin and the maximum value αyMax for all αy.

[Other Modification]

In the above embodiments, the expected values of the correction value α, not the expected values of transform coefficients T, have become identical. However, it is also possible that the expected values of transform coefficients T become identical. A relationship between the transform coefficients T and the correction factors α is represented by the following equation.

$T(c,i,j)=R(c,i,j)+\alpha \times D(c)$

As can be seen from above equation, since the transform coefficients T and the correction factors α have a linear relationship therebetween, all of portions described in connection with the correction factors α can be replaced by description for the transform coefficients T by using the above equation.

Further, although the above embodiment has been described through an example of the JPEG, it may be applied to the JPEG2000.

In the JPEG2000, ranges of αy, αx and αT are as follows.

$-0.5 \leq \alpha y$, $\alpha x$ and $\alpha T \leq 0.5$, when $Q(c,i,j) \neq 0$ $-1 \leq \alpha y$, $\alpha x$ and $\alpha T \leq 1$, when $Q(c,i,j)=0$ αmin and αmax are be set to satisfy the above ranges.

Furthermore, although the expected values of transform coefficients have been estimated in the above embodiments, these expected values may be measured and embedded into the code data in the encoding process.

In this case, the expected-value estimating section 540 outputs the expected values embedded into the code data to the correcting section 580 as they are.

In addition, although the plurality of dequantization values has been calculated for one quantization index value by referring to the neighboring quantization index values (i.e., through the filtering process) in the above embodiments, the invention is not limited thereto. For example, the plurality of dequantization values may be generated for one quantization index value by generating random number.

What is claimed is:

1. A dequantizing apparatus for decoding lossy compressed original data, comprising:
   a dequantization-value estimating section that receives quantization index values and generates a plurality of dequantization values for each quantization index value;
   a distribution-information acquiring section that acquires distribution information of original data corresponding to each quantization index;

a correcting section that corrects at least a portion of the dequantization values generated by the dequantization-value estimating section, based on the distribution information acquired by the distribution-information acquiring section;

a distribution-information generating section that generates distribution information of the quantization indexes and applies a polygonal-line approximation to a frequency distribution of the quantization index values to generate a probability density function of the quantization indexes so that a polygonal line passes an internal division point according to a ratio of frequencies of adjacent quantization index values between the adjacent quantization index values in the frequency distribution of the quantization index values; and an output section that outputs a decoded image based on the dequantization values, wherein:

the distribution-information acquiring section acquires the distribution information of the quantization indexes generated by the distribution-information generating section as the distribution information of the original data and acquires the probability density function generated by the distribution-information generating section as a probability density function of the original data.

2. A dequantizing apparatus for decoding lossy compressed original data, comprising:

a dequantization-value estimating section that receives quantization index values and generates a plurality of dequantization values for each quantization index value;

a distribution-information acquiring section that acquires distribution information of original data corresponding to each quantization index;

a correcting section that corrects at least a portion of the dequantization values generated by the dequantization-value estimating section, based on the distribution information acquired by the distribution-information acquiring section;

a distribution-information generating section that generates distribution information of the quantization indexes and applies a polygonal-line approximation to a frequency distribution of the quantization index values to generate a probability density function of the quantization indexes; and an output section that outputs a decoded image based on the dequantization values, wherein:

the distribution-information acquiring section acquires the distribution information of the quantization indexes generated by the distribution-information generating section as the distribution information of the original data and acquires the probability density function generated by the distribution-information generating section as a probability density function of the original data;

when the frequency of a center quantization index value of three continuous quantization index values in the frequency distribution of the quantization index values is larger than those of two other quantization index values, the distribution-information generating section performs the polygonal-line approximation to increase the frequency of the center quantization index value to be larger than an actual frequency of the center quantization index value; and when the frequency of the center quantization index value of the three continuous quantization index values is smaller than those of two other quantization index values, the distribution-information generating section performs the polygonal-line approximation to decrease the frequency of the center quantization index value to be smaller than the actual frequency of the center quantization index value.

3. A dequantizing apparatus for decoding lossy compressed original data, comprising:

a dequantization-value estimating section that receives quantization index values and generates a plurality of dequantization values for each quantization index value;

a distribution-information acquiring section that acquires distribution information of original data corresponding to each quantization index;

a correcting section that corrects at least a portion of the dequantization values generated by the dequantization-value estimating section, based on the distribution information acquired by the distribution-information acquiring section;

a distribution-information generating section that generates distribution information of the quantization indexes and applies a polygonal-line approximation to a frequency distribution of the quantization index values to generate a probability density function of the quantization indexes; and an output section that outputs a decoded image based on the dequantization values, wherein:

the distribution-information acquiring section acquires the distribution information of the quantization indexes generated by the distribution-information generating section as the distribution information of the original data and acquires the probability density function generated by the distribution-information generating section as a probability density function of the original data; and when three continuous quantization index values in the frequency distribution of quantization index values are represented as h(q−1), h(q) and h(q+1), respectively, the distribution-information generating section calculates a polygonal-line approximation value h'(q) for a center quantization index value using the following equation:

$$h'(q) = h(q) \times \frac{h(q)}{\left\{ \frac{1}{(h(q)+h(q-1))} + \frac{1}{(h(q)+h(q-1))} \right\}}.$$

4. A dequantizing apparatus for decoding lossy compressed original data, comprising:

a dequantization-value estimating section that receives quantization index values and generates a plurality of dequantization values for each quantization index value;

a distribution-information acquiring section that acquires distribution information of original data corresponding to each quantization index;

a correcting section that corrects at least a portion of the dequantization values generated by the dequantization-value estimating section, based on the distribution information acquired by the distribution-information acquiring section;

a distribution-information generating section that generates distribution information of the quantization indexes and applies a polygonal-line approximation to a frequency distribution of the quantization index values to generate a probability density function of the quantization indexes; and an output section that outputs a decoded image based on the dequantization values, wherein:

the distribution-information acquiring section acquires the distribution information of the quantization indexes generated by the distribution-information generating section as the distribution information of the original data and acquires the probability density function generated by the distribution-information generating section as a probability density function of the original data;

the distribution-information generating section applies the polygonal-line approximation to the frequency distribution of the quantization index values to generate the probability density function of the quantization indexes, when the quantization index values are in a first range; and the distribution-information generating section approximates the frequency distribution of the quantization index values based on a Laplace distribution, to generate the probability density function of the quantization indexes, when the quantization index values are in a second range.

\* \* \* \* \*